United States Patent [19]

Prenner et al.

[11] Patent Number: 4,528,469
[45] Date of Patent: Jul. 9, 1985

[54] COMPACT A.C. MACHINE HAVING PLURAL VENTILATION DUCTS

[75] Inventors: Herbert Prenner, Windisch; Urban Ulrich, Fislisbach; Max Voser, Scherz; Beat Zimmerli, Lupfig, all of Switzerland

[73] Assignee: BBC Brown, Boveri & Company, Limited, Baden, Switzerland

[21] Appl. No.: 584,632

[22] Filed: Feb. 29, 1984

[30] Foreign Application Priority Data

Mar. 10, 1983 [CH] Switzerland ............... 1305/83

[51] Int. Cl.$^3$ .............................................. H02K 9/00
[52] U.S. Cl. ........................................ 310/59; 310/65; 310/89; 310/258
[58] Field of Search ............... 310/58, 59, 60 R, 55, 310/64, 65, 57, 89, 91, 216, 254, 258, 259, 52, 53; 336/55, 59, 60

[56] References Cited

U.S. PATENT DOCUMENTS

| 2,508,207 | 5/1950 | Woll | 310/57 |
| 2,663,808 | 12/1953 | Rosenberg | 310/59 |
| 2,818,515 | 12/1957 | Dolenc | 310/57 |
| 2,920,218 | 1/1960 | Beckwith | 310/55 |
| 3,787,744 | 1/1974 | Saito | 310/258 |
| 4,352,034 | 9/1982 | Karhan | 310/55 |
| 4,399,382 | 8/1983 | Volkrodt | 310/216 |
| 4,450,373 | 5/1984 | Miller | 310/258 |

OTHER PUBLICATIONS

Construction of Electrical Machines (Konstruktion Electrischer Maschinen), E. Wiedemann et al.; 1967; Springer Verlag; pp. 260–264.
Electrotechnical Textbook (Leitfaden Der Electrotechnik), von Dobbeler; 1950; B. G. Teubner Verlag; 1950; pp. 69–75.

Primary Examiner—R. Skudy
Attorney, Agent, or Firm—Oblon, Fisher, Spivak, McClelland & Maier

[57] ABSTRACT

An electrical alternating current machine having a stator sheet metal body defining an external contour of a regular n-sided polygon or a circular sheet metal shape. The radial and axial restraint of the sheet metal pack occurs by means of casing walls, tension rails (23) and end plates. The air is conveyed in the electrically unused casing corners. The sheet metal pack, together with the casing walls and end plates, form a compact self-supporting constructional unit with reduced shaft centerline height for a given power.

10 Claims, 10 Drawing Figures

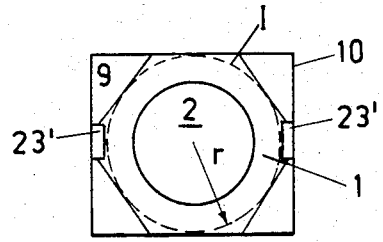
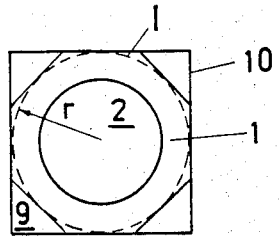
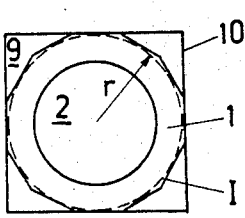
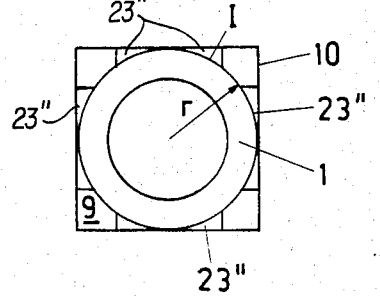
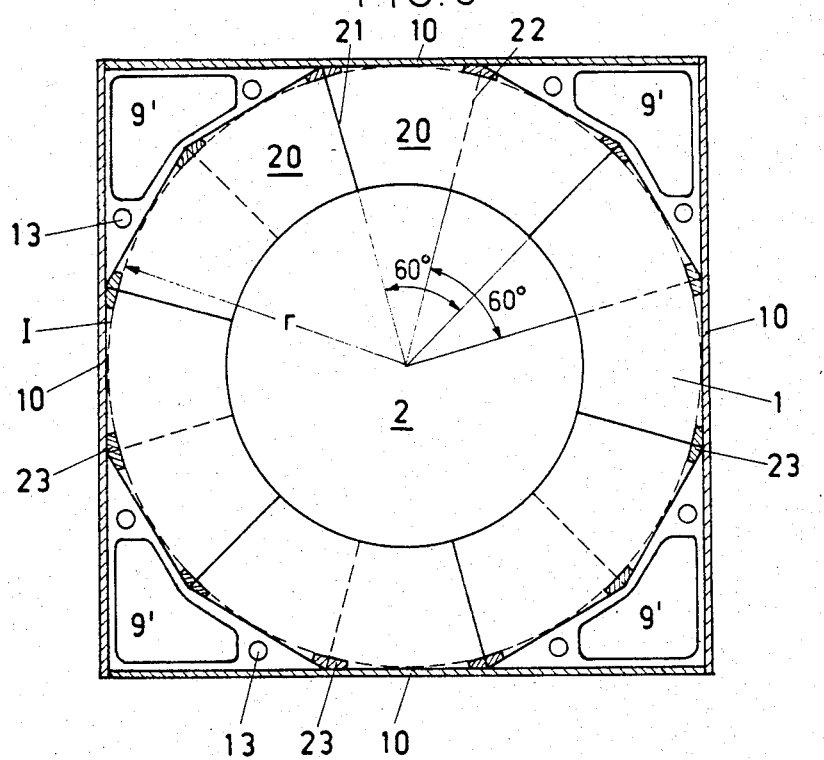

COMPACT A.C. MACHINE HAVING PLURAL VENTILATION DUCTS

BACKGROUND OF THE INVENTION

1. Field of the Invention

The invention relates to dynamoelectric machines, and more particularly to an alternating current machine having a housing and a stator core. Such a machine is known, for example, from the book by Wiedemann-/Kellenberger "Konstruktion elektrischer Maschinen", Springer-Verlag Berlin, Heidelberg, New York, 1967, pages 261 et seq., in particular FIG. 170 on page 262.

2. Description of the Prior Art

In the standard designs of electrical alternating current machines with shaft centerline heights of up to about 1000 mm, a stator sheet metal pack with circular sheet metal shape is generally installed in a casing which is either of right parallelepiped or cylindrical shape. The sheet metal pack can either be designed to be self-supporting or it is inserted in layers sheet by sheet or partial pack by partial pack into the casing. In the first case, it is so internally restrained by longitudinal rods (tension rods) or tension strips that it forms an independent closed unit which can be produced completely and also wound outside the machine and only inserted in the casing as a final step. A stator built up in this manner is referred to in the relevant literature as an insert stator. The casing serves only as the enclosing external cover, which is usually also used for conveying the cooling gas. It is mechanically loaded, in the main, by the weight of the machine. In the second case, the metal sheets or partial packs inserted as layers are held together by the casing, pressed together and connected to the casing spine. The casing is thus loaded not only by the machine weight but also by the longitudinal and lateral forces holding the sheet metal pack together (cf. Moeller-Werr "Leitfaden der Elektrotechnik", Volume III "Konstruktion elektrischer Maschinen", B. G. Teubner Verlagsgesellschaft, Leipzig, 1950, pages 70 et seq.).

In both cases, supporting the sheet metal pack or the individual sheets/partial packs involves an undesirable increase in the shaft centreline height and the installation volume.

SUMMARY OF THE INVENTION

The objects of the invention are to provide an alternating current machine of the generic type mentioned at the outset, which combines the advantages of both stator types and, in addition, permits a substantial reduction in the shaft centreline height and therefore the casing height and width for given active component dimensions.

These and other objects are achieved according to the invention by providing a novel alternating current machine whose stator sheet metal body is clamped between two end plates and is subdivided by radially extending ventilation paths into individual partial sheet metal packs. This ventilation paths are formed by distance elements located between the partial body packs. The stator sheet metal body is surrounded by a casing which leaves space free between itself and the back of the sheet metal body for removal of the cooling gas flowing out from the radial ventilation paths. The casing walls form tangents to an inscribed circle, which is inscribed in the sheet metal shape external contour. In the casing corners, ducts separated from one another only by the sheet metal body and extending over the entire sheet metal body length are provided. These ducts are bounded substantially only by the casing walls and the sheet metal body back. The sheet metal body is clamped together in the axial direction by clamping means running outside the said inscribed circle and the distance elements remote from the air gap are mostly directed in the direction towards the ducts in the casing corners.

The main characteristic of the invention is the consistent utilization of the space provided by the machine casing: the electrically and magnetically effective iron cross-section extends as far as the casing walls. Independent of the external contour of the sheet metal body, all the elements with support functions, for supporting, restraining the sheet metal body and for conveying cooling gas are located outside the inscribed circle and do not adversely affect the electrical/magnetic function of the sheet metal body. The most striking feature, in this connection, is the considerable reduction in the shaft centerline height for given machine power and iron volume. Apart from the smaller space requirements, the achievable smaller shaft centerline height has an overall effect on the manufacturing and material costs.

In the further development of the invention each sheet metal body is clamped between two opposite casing walls and has line and/or surface support on the casing walls, and the casing walls are solidly connected to the end plates of the casing so as to exert a prestress, which is effective in the axial direction, on the sheet metal body. Thus, the sheet metal body, together with the casing walls and the end plates, forms a self-supporting constructional unit with all the advantages of an insert stator. Further according to the invention, both end plates together with the intermediate sheet metal body are restrained by means of tension strips, which run in the axial direction outside the inscribed circle. Additionally, the sheet metal body is provided on its external periphery with recesses evenly distributed over the external periphery and matched to the cross-section of the tension strips, the recesses extending no further than the inscribed circle. These additional features of the invention correspond even more to the classical insert stator, with the difference that the press plates of the insert stator also assume the function of the casing end plates.

Common to all the embodiments is the large saving in material. The conveyance of cooling gas takes place in the corners of the stator housing not used electrically/-magnetically, which stator housing has only partially to assume carrying and support functions. The ducts in the casing corners, particularly in the case of sheet metal shapes which are round or have eight or more sides, are large enough to convey the necessary cooling gas quantities at low flow velocity.

The disappearance of the annular space between sheet metal pack and casing does not result in deterioration—which might be expected—in the cooling conditions for the stator winding and the stator sheet metal body—particularly where the means for deliberately conveying the cooling gas flowing inwards from the machine air gap are designed as protrusions extending in the direction towards the ducts. These protrusions are so located and distributed in the peripheral direction around the ventilation ducts that approximately the same air quantities enter between the individual protrusions and between the protrusions and the casing wall into the prismatic ducts and that the flow velocity in this region is also the same everywhere.

In principle, it is possible to restrain the end plates and the sheet metal pack located between them by means of tension rods, the tension rods passing through the ducts, i.e. outside the sheet metal pack. This further development is of interest in embodiments in which the cooling air is led away via casing openings located on the casing cover.

In the case of alternating current machines with cooling gas outlet in the region of the machine end part, however, the contact surfaces for the tension rods would reduce the flow cross-sections too much. A further development of the invention therefore provides for welding at least one, but preferably both end plates (in the case of a sheet metal pack axially pressed together by means of the end plates as above) to all four casing walls. The welding operations on the casing longitudinal edges and the casing end edges necessary for this purpose occur almost exclusively outside the sheet metal body sensitive to such operations, so that iron circuits and the like are avoided.

Also in the case of the embodiments with tension strips, welding operations on the latter have only slight adverse effects on the sheet metal body because the welding operations are only carried out outside the effective sheet metal cross-section. This particularly applies to sheet metal bodies built up from individual segmental sheets. The tension strips welded to the sheet metal body substantially determine the stability of the sheet metal composite.

It would be possible in principle to match the hole in the end plate to the internal contour of the stator metal sheets, i.e. to produce the pressure fingers for the stator teeth integrally with the end plates. For manufacturing reasons, however, it is advantageous to provide protrusions acting as pressure fingers between the two end plates and the outer end sheets of the stator sheet metal pack, which protrusions are solidly connected either to the end plates or to the end sheets of the outer partial packs. These protrusions impose a gap between the end plates and the end sheets and provide cooling ducts on the ends of the sheet metal pack.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1a–1d show diagrammatic representations with a stator sheet metal body of an electrical alternating current machine and having different sheet metal shapes, FIG. 5 is a cross-sectional view through a sheet metal body with twelve-sided external contour.

DESCRIPTION OF THE PREFERRED EMBODIMENTS

Figure 2:
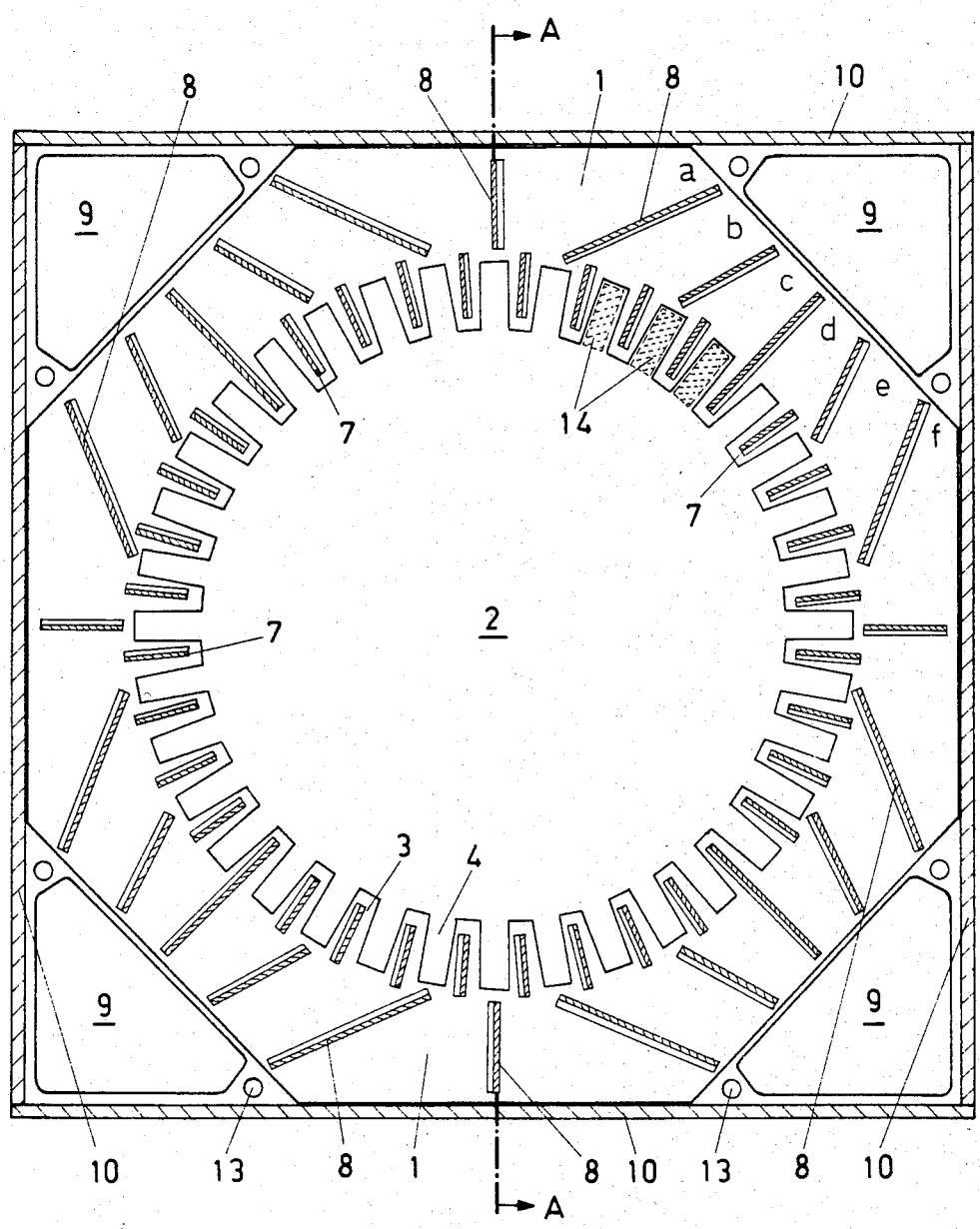
FIG. 2 is a cross-sectional view through a stator according to the invention, in the region of the ventilation ducts.

Referring now to the drawings, wherein like reference numerals designate identical or corresponding parts throughout the several views, and more particularly to FIG. 1 thereof, the cross-sections shown in FIG. 1 show six-sided (FIG. 1a), eight-sided (FIG. 1b), twelve-sided (FIG. 1c) and circular (FIG. 1d) sheet metal shapes. It may be clearly seen that, in each case, the inscribed circle I and, therefore, the effective sheet metal body diameter $2r$ correspond to the internal casing diameter, the casing 10 therefore being optimally utilized but the casing corners having sufficient flow area to convey the cooling gas.

FIG. 2 represents an exemplary embodiment given in more detail for the case of an eight-sided sheet metal shape.

Figure 4:
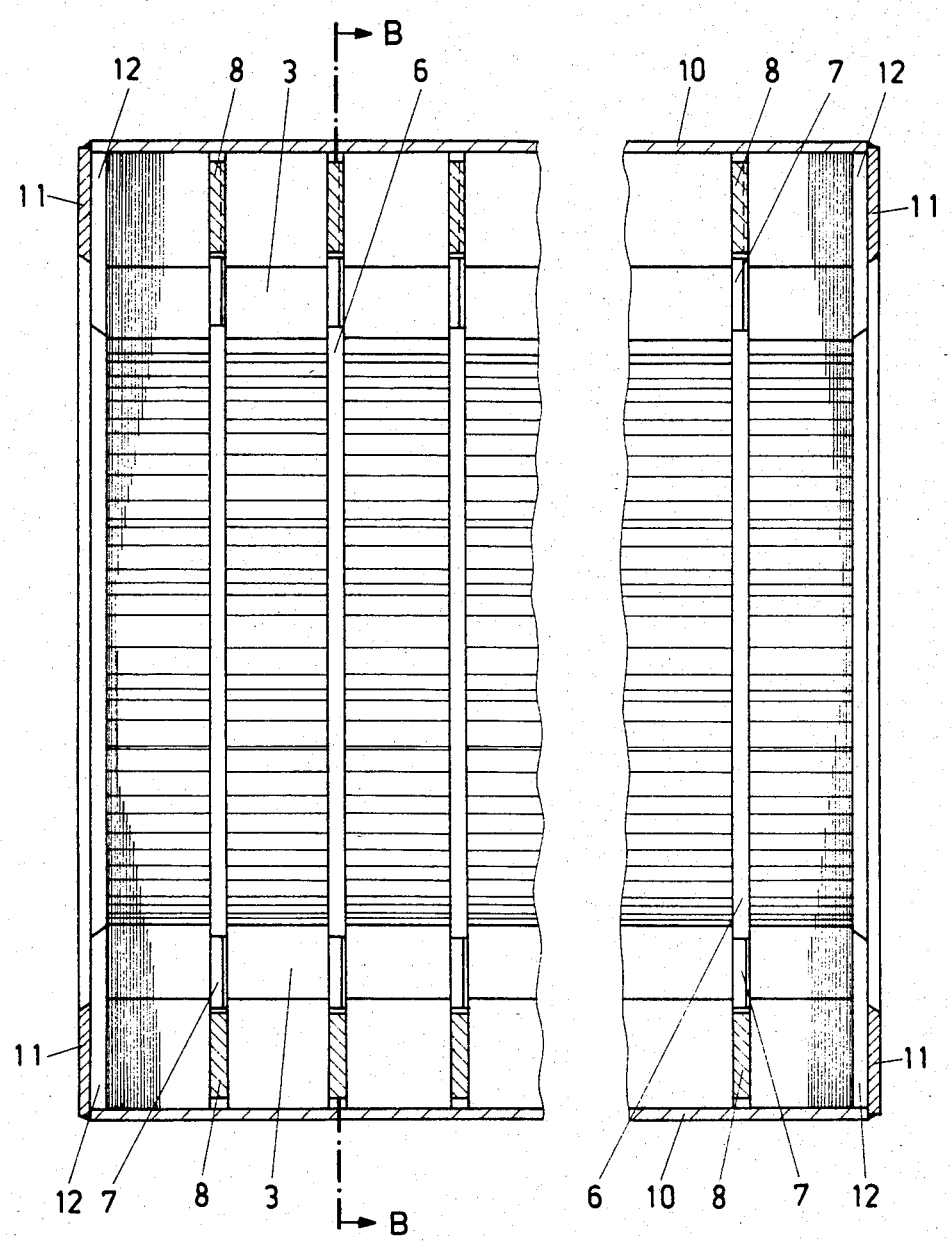
FIG. 4 is a longitudinal cross-sectional view through the stator in accordance with FIG. 2 and FIG. 3 along the plane AA.

In the cross-section through the stator central part in accordance with FIG. 2, 1 indicates a stator metal sheet. The stator metal sheet has the external contour of a regular octagon, having a stator bore 2, stator teeth 3 and stator grooves 4. A multiplicity of stator metal sheets 1 are combined to partial sheet metal packs 5 shown in FIG. 6, which sheet metal packs are separated from one another by radially extending ventilation ducts 6 (FIG. 4). These ventilation ducts are formed by two groups of distance elements, indicated by 7 near the air gap and by 8 remote from the air gap, which distance elements are each fastened to an end sheet of a partial pack. All the distance elements are of L-shaped cross-section and are, for example, welded to the particular end sheets. The distance elements 7 near the air gap extend in the radial direction over practically the entire height of the stator tooth 3. The other distance elements 8 extend essentially in the direction towards the prismatic ducts 9 in the casing corners.

The stator sheet metal body is surrounded by a quadriform casing consisting of casing walls 10 and end plates 11. The casing walls are in contact with every second side surface in series of the sheet metal pack and support the latter in the radial direction. The casing walls 10 protruding beyond the said side surfaces butt against one another and are welded together. In this manner, prismatic cooling ducts 9 are produced in the casing corners, which cooling ducts are in free connection with the radial ventilation ducts 6 between the partial packs 5. The cooling ducts 9 serve to remove the cooling gas emerging from the ventilation ducts 6.

Figure 3:
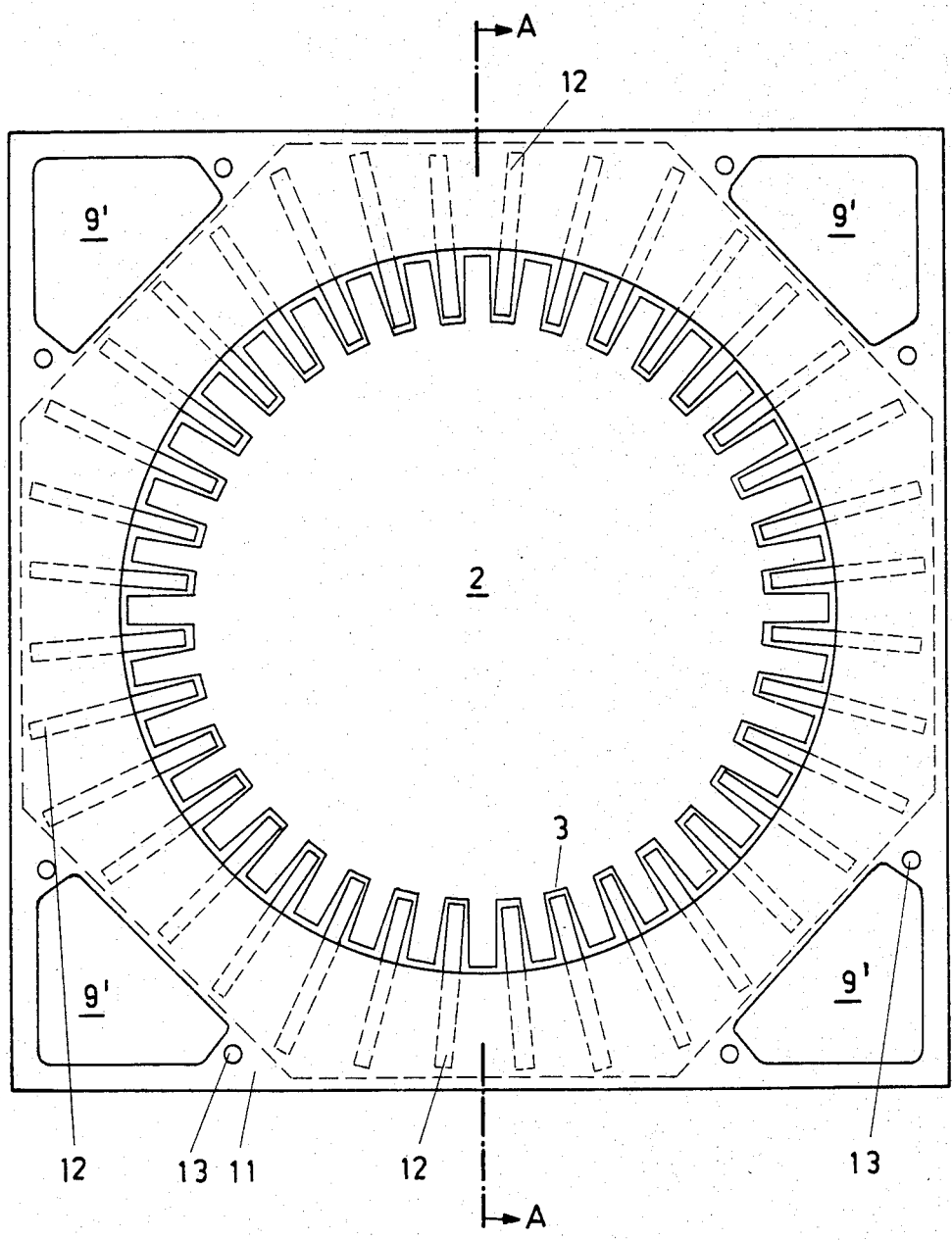
FIG. 3 is a view on the end of the stator with the stator end part removed and without stator winding.

The end plates 11 of the casing are welded, over their total periphery, to the end edges of the casing walls 10 so as to exert a prestress acting axially on the sheet metal pack. Protrusions 12 acting as pressure fingers for the stator sheet metal pack are located between the end plates 11 and the end sheets of the outer partial packs 5. These protrusions extend in the radial direction from the ends of the stator teeth 3 near the air gap to the periphery of the stator end sheets (FIG. 3). They are welded to either the end plate 11 or to the end sheets of the outermost partial sheet metal body.

Each end plate 11 has (in addition to the stator bore 2) four further openings 9', which provide a free connection between the prismatic ducts 9 and the space outside the stator central part. These openings 9' have a cross-section slightly smaller than that of the prismatic ducts, due to attachment surfaces and holes 13 for fastening and centering two stator end parts (not shown). These stator end parts accept the winding head, the fan with all its associated casings and the rotor bearings.

When the electrical machine is in operation, the cooling gas emerging from the rotor and the machine air gap passes into the radially extending ventilation ducts 6 and to a slight extent also into the radially extending ducts between the sheet metal pack and the end plates 11 and is conducted between the distance elements 8 remote from the air gap into the prismatic ducts 9 and, from there, outwards through the openings 9' in the end plates 11. As may be seen from FIG. 2, the location and distribution of the distance elements 8 remote from the air gap are so chosen that the cooling gas at the outlet into the prismatic duct 9 has approximately the same velocity everywhere. In the present exemplary embodiment, the effective outlet cross-sections a, . . . , f (FIG. 2) are each proportional to the effective entry cross-sections of the ducts between the distance elements 8 and between the latter and the casing wall allocated to them.

FIG. 5 shows an exemplary embodiment of the invention for a sheet metal body with twelve-sided external contour, the same parts being provided with the same reference numbers as in the previous figures. A difference from what has been previously described is that the metal sheets are made up of individual segmental sheets 20 which, in known manner, are offset from layer to layer. The butt joints of one layer are indicated by 21 and those of the layer below it (shown dashed) by 22. The sheets 20 each have three recesses at the external periphery. The butt joints 21 and 22 lie in the region of the recesses. The depth of the recesses extends as far as the inscribed circle I. These recesses collectively form axially extending grooves on the outer surface of the sheet metal body. Tension strips or rails 23 of prismatic cross-section are inserted in these grooves, which tension strips are welded to the sheet metal body so as to prestress the sheet metal body in the axial direction.

Figure 6:
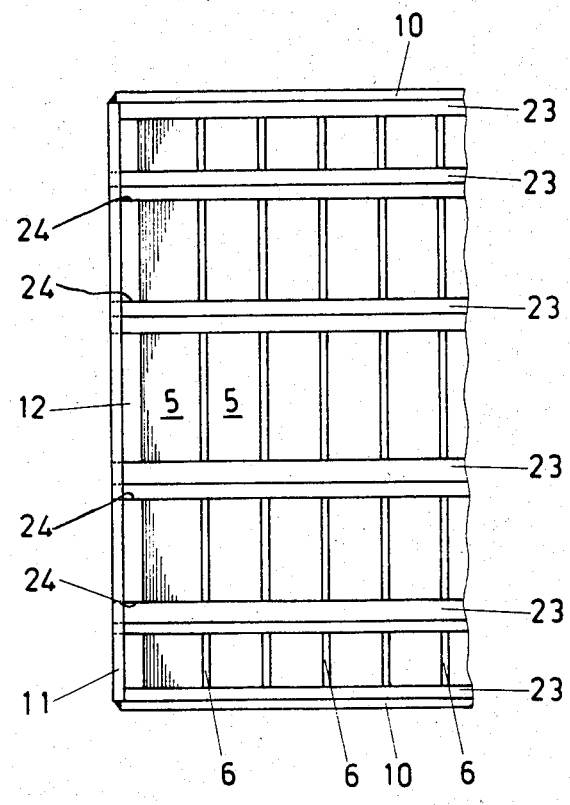
FIG. 6 is a side view on the stator in accordance with FIG. 5 with the casing side wall removed.

As may be seen from the side view according to FIG. 6, the tension or strips rails 23 are led through appropriately shaped holes 24 in the two end plates 11 and welded at that point by means of welds (not shown). Corresponding to the embodiment in accordance with FIGS. 2 to 4, pressure fingers 12 are located between the end sheet of the outermost partial sheet metal body 5 and the end plate 11; only one pressure finger running at right angles to the plane of the drawing is shown for reasons of clarity. For the same reason, the inclusion of the distance elements 7, 8 between the individual partial sheet metal bodies 5 has been omitted.

The tension or strips rails are of ridge prism cross-section in the shape shown, one "ridge surface" being in contact with the casing wall 10 in each case. Alternatively, the tension strips or rails can have girder section, the free surface running parallel to the casing wall and being in contact with it. In both cases, there is surface support of the sheet metal body on the casing walls.

The possibility of restraining the stator sheet metal body using tension rails which are secured on the end plates of the casing can, of course, be used on six-sided or eight-sided sheet metal shapes because, in each of the two cases, there is sufficient space outside the inscribed circle to accommodate the recesses for the tension or strips rails 23. This applies to both segmental sheets and single-piece sheets.

In the case of metal sheets of six-sided shape (FIG. 1a), it is moreover possible to support the stator sheet metal body on its side surfaces at the bottom and the top and by means of tension strips or rails 23' at the sides. These tension strips are located in lateral grooves of the sheet metal body and extend, at a maximum, to the inscribed circle I and do not, therefore, reduce the effective sheet metal cross-section.

In the case of a circular sheet metal shape in accordance with FIG. 1d, the tension strips or rails 23'' are located on the external periphery of the sheet metal body and are welded to the latter and to the end plates. The tension strips or rails 23'' have a cross-section similar to a wedge, the free wedge surface being in contact with the casing wall 10.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An alternating current machine comprising:
   a rectangular casing having four side walls and two end plates; and
   a stator sheet metal body mounted in said casing and surrounded thereby on all sides of said stator sheet metal body,
   said stator sheet metal body comprising,
   a stator bore and plural partial sheet metal packs each including plural individual sheets stacked one against another,
   each said pack having at least six sides defining a peripheral polygonal contour and separated from an adjacent of said packs by means of distance elements defining radial ventilation dusts between said packs,
   said partial sheet metal packs having side surfaces and arranged behind one another so that the pack side surfaces run parallel to the casing side walls and are in contact with at least two opposed of said casing side walls,
   the side surfaces of the stator sheet metal body which directly adjoin said side surfaces of the stator sheet metal body in contact with said casing side walls defining together with said casing walls axially running corner ducts in corners of said casing,
   said axially running corner ducts communicating freely with the radial ventilation ducts between the partial sheet metal packs to provide a connection between the stator bore and said axially running corner ducts,
   axially disposed clamping means for clamping the entire stator sheet metal body together in the axial direction,
   said clamping means being in contact with said end plates and each of said casing side walls and disposed outside of an inscribed circle, which is inscribed in said sheet metal body contour such that said clamping means is disposed outside the electrically and magnetically active stator sheet metal body,
   said distance elements including distance elements remote from the stator bore and which are directed in the direction towards the ventilation ducts in the casing corners, and
   said end plates comprising openings which connect the cooling ducts in the casing corners with the outside space.

2. An alternating current machine according to claim 1, wherein said clamping means comprises means for clamping each partial sheet metal pack between two opposite casing walls and each said pack is supported on the casing walls, and said casing walls are solidly connected to the end plates of the casing so as to exert a prestress, which is effective in the axial direction, on the sheet metal body.

3. An alternating current machine according to claim 1, wherein said clamping means comprises:
tension strips restraining both end plates together with the sheet metal body, said tension strips running in the axial direction outside the inscribed circle.

4. An alternating current machine to claim 3, wherein said sheet metal body comprises recesses formed on its external periphery, said recesses evenly distributed over the external periphery and matched to the cross-section of the tension strips, said recesses extending no further than the said inscribed circle.

5. An alternating current machine according to claim 4, wherein said sheet metal body comprises:
plural individual segmental sheets offset layerwise relative to one another, said segmented sheets having butt joints defining said recesses.

6. An alternating current machine according to claim 1, comprising:
an eight-sided sheet metal body having each second side surface thereof in contact with an associated casing wall and supported thereby.

7. An alternating current machine according to claim 1, comprising:
an twelve-sided sheet metal body having each third side surface thereof in contact with an associated casing wall and supported thereby.

8. An alternating current machine according to claim 3, wherein said tension strips have an approximately wedge-shaped cross-section and are welded externally to the outer periphery of the sheet metal body, one free surface of each of the tension strips extending parallel to the casing wall and in a plane tangential to the sheet metal body.

9. An alternating current machine according claim 1, comprising:
protrusions acting as pressure fingers for the stator sheet metal pack, said protrusions inserted between both end plates and the outer end sheets of the stator sheet metal body, said protrusions solidly connected either to the end plates or to said end sheets and imposing a distance between the end plates and the end sheets.

10. An alternating current machine according to claim 1, wherein said distance elements defining said radial ventilation ducts and extending in the direction towards the axially running corner ducts are separated, oriented and distributed around the periphery of the radial ventilation ducts so that approximately the same cooling gas quantities emerge into the axially running corner ducts from between adjacent distance elements so that the flow velocities of the cooling gas are also approximately equal everywhere.

* * * * *